United States Patent
Seetharam et al.

(10) Patent No.: US 9,232,084 B2
(45) Date of Patent: Jan. 5, 2016

(54) TRACKING SOURCE OF JOB PARAMETERS IN PRINT JOBS

(71) Applicant: XEROX CORPORATION, Norwalk, CT (US)

(72) Inventors: Raju Seetharam, Pittsford, NY (US); David C. Robinson, Penfield, NY (US); Steven Haehn, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/183,853

(22) Filed: Feb. 19, 2014

(65) Prior Publication Data

US 2015/0237220 A1    Aug. 20, 2015

(51) Int. Cl.
*G06F 3/12* (2006.01)
*H04N 1/00* (2006.01)

(52) U.S. Cl.
CPC ........... *H04N 1/001* (2013.01); *H04N 1/00957* (2013.01)

(58) Field of Classification Search
CPC .............. H04N 1/001; H04N 1/00482; H04N 1/00957; G06F 3/1257; G06F 3/1253; G06F 3/1273
USPC ...................................... 358/1.15, 1.13, 1.16
See application file for complete search history.

(56) References Cited

U.S. PATENT DOCUMENTS

| | | | |
|---|---|---|---|
| 7,454,482 B2 | 11/2008 | Barnard et al. | |
| 7,839,521 B2 | 11/2010 | Bard et al. | |
| 8,136,120 B2 | 3/2012 | Morales et al. | |
| 8,320,008 B2 | 11/2012 | Jahn | |
| 8,477,343 B2 | 7/2013 | Cech et al. | |
| 2007/0070377 A1* | 3/2007 | Hirabayashi | 358/1.13 |
| 2013/0151491 A1 | 6/2013 | Gislason | |

\* cited by examiner

*Primary Examiner* — Marivelisse Santiago-Cordero
*Assistant Examiner* — Kent Yip
(74) *Attorney, Agent, or Firm* — Gibb & Riley, LLC

(57) ABSTRACT

Methods and devices receive a print job, evaluate the print job to identify job parameter settings and associated sources of the job parameter settings, transmit the job parameter settings and the associated sources to a database, and transmit the print job to a marking device to cause the marking device to print the print job. These methods and devices also provide access to the database to view the job parameter settings and the associated sources, and/or change the job parameter settings. The access to the database is provided before and/or after the marking device prints the print job. When evaluating the print job, these methods and devices identify "potential" and "final" job parameter settings and associated sources. The final settings and sources are used to perform marking and finishing operations, while the potential setting and sources comprise a pre-printing, job preparation history in the database.

16 Claims, 5 Drawing Sheets

| JOB NAME | IMPORTANT.PDF | JOB ID | 15 | | | | | | |
|---|---|---|---|---|---|---|---|---|---|
| JOB TICKET ATTRIBUTES | JOB TICKET VALUES | JOB PROPERTY ATTRIBUTES | JOB PROPERTY VALUES | QUEUE ATTRIBUTES | QUEUE VALUES | PAGE EXCEPTION ATTRIBUTES | PE VALUES | FINAL VALUES | SOURCE OF FINAL VALUES |
| COPY COUNT | 4 | | | | | | | 4 | JOB TICKET ATTRIBUTES |
| | | DESTINATION PROFILE | DC1000.ICC | DESTINATION PROFILE QUEUE OVERRIDE SET | DC1000SPECIAL.ICC | PAGES 3-4 DESTINATION PROFILE | DC1000NEW.ICC | DC1000SPECIAL.ICC | QUEUE ATTRIBUTES |
| HALFTONE | 175 | HALFTONE | 200 | HALFTONE | 175 | | | 200 | JOB PROPERTY ATTRIBUTES |
| | | IMPOSITION | 2UP | IMPOSITION | SIGNATURE | | | SIGNATURE | QUEUE ATTRIBUTES |
| STOCK | TRAY 1 | STOCK | WHITE UNCOATED 90 GSM | STOCK QUEUE OVERRIDE SET | WHITE COATED 170 GSM | PAGES 10-12 STOCK | TRAY 2 | TRAY 2 | PAGE EXCEPTION ATTRIBUTES |

| | JOB NAME | JOB ID | | | | | | FINAL VALUES | SOURCE OF FINAL VALUES |
|---|---|---|---|---|---|---|---|---|---|
| | JOB TICKET VALUES | JOB PROPERTY ATTRIBUTES | JOB PROPERTY VALUES | QUEUE ATTRIBUTES | QUEUE VALUES | PAGE EXCEPTION ATTRIBUTES | PE VALUES | | |
| JOB TICKET ATTRIBUTES | IMPORTANT.PDF | 15 | | | | | | | |
| COPY COUNT | 4 | | | | | | | 4 | JOB TICKET ATTRIBUTES |
| | | DESTINATION PROFILE | DC1000.ICC | DESTINATION PROFILE QUEUE OVERRIDE SET | DC1000SPECIAL.ICC | PAGES 3-4 DESTINATION PROFILE | DC1000NEW.ICC | DC1000SPECIAL.ICC | QUEUE ATTRIBUTES |
| HALFTONE | 175 | HALFTONE | 200 | HALFTONE | 175 | | | 200 | JOB PROPERTY ATTRIBUTES |
| | | IMPOSITION | 2UP | IMPOSITION | SIGNATURE | | | SIGNATURE | QUEUE ATTRIBUTES |
| STOCK | TRAY 1 | STOCK | WHITE UNCOATED 90 GSM | STOCK QUEUE OVERRIDE SET | WHITE COATED 170 GSM | PAGES 10-12 STOCK | TRAY 2 | TRAY 2 | PAGE EXCEPTION ATTRIBUTES |

TRACKING SOURCE OF JOB PARAMETERS IN PRINT JOBS

BACKGROUND

Systems and methods herein generally relate to print jobs and to methods and devices that analyze print jobs.

Parameters of print jobs (such as for finishing, imposition, color management) can be set at the print queue, print job, page description language (PDL) creation, exception page creation, line printer remote (LPR), and job ticket level. These settings are reconciled before a job is submitted for print. The reconciliation can be performed, for example, using a precedence model.

However, it is sometimes difficult (or impossible) to determine on what level an attribute had been set on a print job. The problem occurs when attempting to debug the reasons for unexpected and/or unacceptable output, or when changing the precedence for an attribute value immediately before print submission or reprint.

SUMMARY

Exemplary system and printing devices herein comprise a computerized device that receives a print job. The computerized device evaluates the print job to identify job parameter settings and associated sources of such job parameter settings. A non-transitory computer storage medium is operatively (meaning directly or indirectly) connected to the computerized device, and the computerized device transmits the job parameter settings and the associated sources to a database stored within the non-transitory computer storage medium. Each print job can have its own separate database In addition, a marking device is operatively connected to the computerized device. The computerized device transmits the print job to cause the marking device to print the print job. Also, a graphic user interface is operatively connected to the computerized device, and the graphic user interface provides access to the database to allow a user to view the job parameter settings and the associated sources, and/or change the job parameter settings. The graphic user interface provides access to the database before or after the marking device prints the print job.

The computerized device raster image processes (RIPs) the print job before printing the print job using the marking device. Further, the computerized device identifies "potential" settings and sources, and "final" settings and sources of the job parameter settings and the associated sources when evaluating the print job. These final settings and sources are the ones actually used to perform the raster image processing (RIPing), marking, and finishing operations; however, all the potential setting and sources are all maintained in the database to provide a pre-RIPing, marking, and finishing print job preparation history. Further, the database maintains the potential setting and sources, and the final settings and sources before and after the marking device prints the print job to allow user diagnosis, etc.

Specifically, these "associated sources" can include, for example: a print job property attributes source; a print job ticket attributes source; a print queue attributes source; a page exception attributes source; etc. Similarly, the "job parameter settings" can include, for example: print job properties values; print job ticket values; print queue values; page exception source values; etc.

Stated in method terms, exemplary methods herein can be performed on a system using discrete components that are in communication with one another over a local or wide area network, or methods herein can be performed fully using just an individual printing device. One exemplary method receives a print job into a computerized device, evaluates the print job to identify job parameter settings and associated sources of the job parameter settings, using the computerized device. This exemplary method transmits the job parameter settings and the associated sources from the computerized device to a database stored within a non-transitory computer storage medium that is operatively connected to the computerized device. Each print job can have its own database. Further, this method transmits the print job from the computerized device to a marking device that is also operatively connected to the computerized device, to cause the marking device to print the print job.

This method also provides access to the database to view the job parameter settings and the associated sources, and/or change the job parameter settings, using a graphic user interface that is operatively connected to the computerized device. The access to the database is provided before and/or after the marking device prints the print job. The method performs raster image processing (RIPing) on the print job before printing the print job using the marking device. When evaluating the print job, this method identifies potential settings and sources, and final settings and sources of the job parameter settings and the associated sources. The final settings and sources are used to perform the RIPing, marking, and finishing operations, while the potential setting and sources comprise a pre-RIPing, marking, and finishing print job preparation history. This method maintains the potential setting and sources, and the final settings and sources in the database before and after the marking device prints the print job.

These and other features are described in, or are apparent from, the following detailed description.

BRIEF DESCRIPTION OF THE DRAWINGS

Various exemplary systems and methods are described in detail below, with reference to the attached drawing figures, in which:

FIG. 1 is a table illustrating the features of the job parameter database provided herein;

DETAILED DESCRIPTION

Figure 2:
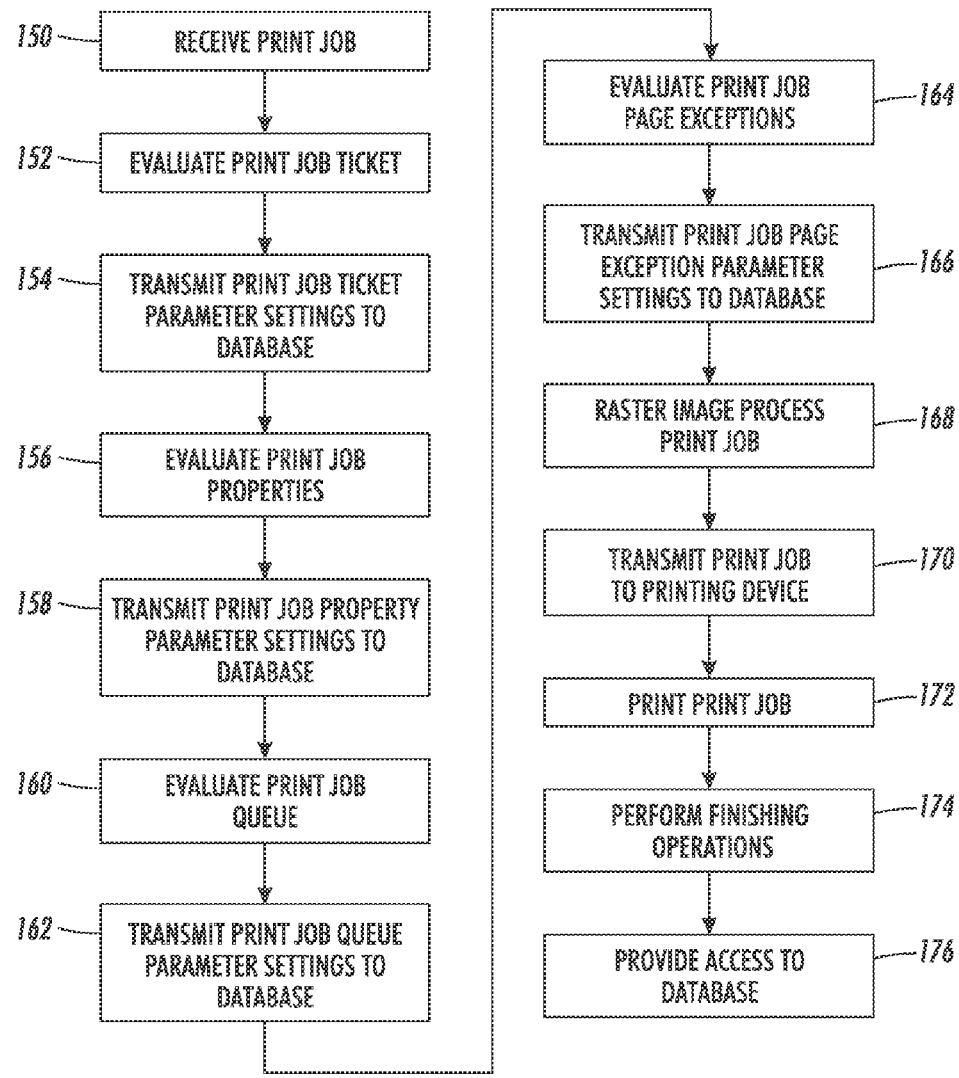
FIG. 2 is a flow diagram of various methods herein.

As mentioned above, it is sometimes difficult (or impossible) to determine on what level an attribute had been set on a print job. Therefore, the systems and methods herein provide a job parameter database that tracks the history of the print job (a pre-RIPing, marking, and finishing print job history) and allows system users to understand all the specified parameter settings on a job and their source, and also allows system users to override/change attributes with the knowledge of the above With the methods and devices herein, each print job has a job parameter database associated with it. The job parameter database includes the attribute/value pairs set at the job, page description language (PDL), line printer remote (LPR), page exception queue and job ticket levels. The database includes additional precedence information such as queue overrides and page exceptions.

The job parameter database can be viewable/updateable on the digital front end (DFE) of the printing device via a cascading menu. The user can request a view of the final reconciled parameter/values before submission, the selections for each parameter contributor (e.g., queue, job ticket, etc.) including the queue name, as well as a view of the attributes on job level, page level, range of pages, etc.

Thus, with the job parameter database added to the DFE, when a job is submitted to the DFE, the gateway through which the submission enters the DFE (on the print server common gateway application programming interface (API)) establishes a database entry for the job. The gateway also queries the accompanying job ticket for attributes/value pairs. The outcome of the query is entered in the database for the "job ticket parameters." The job name and/or job ID number can be included in the database.

Likewise, when a job is submitted for either print or save, print and save, or hold the queue, job and page exception attribute values are queried and entered into the database. Also, the database can include page exception ranges, queue override states, queue name, job identification (ID), etc. If the job is sent to a hold state, the graphic user interface (GUI) will enable viewing of the database contents before print submission. The GUI display highlights which values are "live" for the submission. The user is presented with the option to change the "live" setting.

During raster image processing (RIPing), the common decomposer facility (CDF) monitors the finishing and media libraries that are created by the PDL interpreter. The CDF compares the library attribute/values to those within the database. If there is a discrepancy, it is assumed that a new job parameter value has been entered via the PDL contents. The CDF updates the database with entries for PDL attribute/values. When a job is deleted, the DFE's job manager can eliminate the database entry for the job.

With the job parameter database, the methods and devices herein enable traceability of the origin of job parameters. The methods and devices can also include a low resolution RIP of the job to ascertain the job/page parameters that are based within the PDL before job fulfillment RIPing, printing out the parameters information on a banner or information sheet, etc.

FIG. 1 is a table illustrating the information that is maintained in the job parameter database 100 by the methods and devices herein. More specifically, the methods and devices herein evaluate the print job to acquire information from many different sources that make up the print job. Moving from right to left across the table representing the database 100 shown in FIG. 1, one such source is the job ticket itself.

More specifically, the job ticket attributes are shown in the first column of the table to the far left in FIG. 1, and the job ticket attributes can include copy count, halftone value and type of paper stock to be used during the printing. The second column shows the value of those job ticket attributes. Specifically, the copy count on the job ticket is 4, the halftone setting is 175, and the paper stock should come from tray 1 if the job ticket attributes are followed.

Similarly, the job property attributes and job property values are shown in the next two columns to the right, the queue attributes and queue values are shown in the following two columns to the right, and the page exception attributes and values are shown in the following two columns to the right. Many of these attribute value pairs are different and, therefore, the job parameter database 100 allows the user to easily see the differences between the values of the different sources that contribute to the print job settings.

The final two columns in the database 100 (shown to the far left in FIG. 1) are the final value and an identification of the source of the final value that were used in the actual printing of the print job. For example, with respect to the destination profile attribute, the final print job that was actually printed utilized the queue attribute value of DC1000special.icc; with respect to the halftone attribute, the final print job that was actually printed utilized the job property attribute value of 200; with respect to the imposition attribute, the final print job that was actually printed utilized the queue attribute value of signature; etc.

While a few limited print job setting sources and a few exemplary print job setting sources have been illustrated in FIG. 1, those ordinarily skilled in the art would understand that many more print job setting sources print job setting sources could be utilized and that the foregoing have only been selected as representative examples to demonstrate the functionality of the job parameter database 100 created and utilized by the methods and devices herein.

As shown in FIG. 1, the job parameter database 100 not only provides the final value that was utilized when printing a specific print job, but also identifies the source of the final job parameter setting, as well as a listing of all other sources of job parameter settings which were not utilized in the final print job settings. By providing such information both before and after the print job has been executed, the methods and devices herein provide the user with a history of how the settings for the print job were established, the sources of such settings, as well as the potential settings that were not utilized (and the sources that could have supplied those potential non-utilized settings). This allows the user to more easily identify why printing did not occur in the manner expected.

FIG. 2 is flowchart illustrating exemplary methods herein. Such methods can be performed on a system using discrete components that are in communication with one another over a local or wide area network, or these methods herein can be performed fully using just an individual printing device.

In item 150, the exemplary method shown in FIG. 2 receives a print job into a computerized device. In item 152, this method evaluates the print job ticket to identify print job ticket parameter settings, using the computerized device. In item 154, this exemplary method transmits the print job ticket parameter settings from the computerized device to a database stored within a non-transitory computer storage medium that is operatively connected to the computerized device. Each print job can have its own database.

In item 156, this method evaluates the print job properties to identify print job property parameter settings, using the computerized device. In item 158, this exemplary method transmits the print job property parameter settings from the computerized device to the database. Similarly, in item 160, this method evaluates the print job queue to identify print job queue parameter settings, using the computerized device. In item 162, this exemplary method transmits the print job queue parameter settings from the computerized device to the database. Similarly, in item 164, this method evaluates the print job page exceptions to identify print job page exception parameter settings, using the computerized device. In item 166, this exemplary method transmits the print job page exception parameter settings from the computerized device to the database. While a limited number of parameter settings and associated sources are shown in FIG. 2, those ordinarily skilled in the art would understand that additional parameter settings and associated sources (such as PDL embedded values, etc.) could be evaluated and saved in the database, depending upon specific implementation.

The method performs raster image processing (RIPing) on the print job in item 168. Further, as shown in item 170, this method transmits the print job from the computerized device to a marking device (before or after the RIPing in item 168) that is also operatively connected to the computerized device, and prints the print job (e.g., performs a marking operation on print media) using the marking device in item 172. Similarly, in item 174, the methods herein perform finishing operations (e.g., hole punching, stapling, cutting, binding, bookmaking, folding, etc.) using finishing equipment, according to finishing instructions within the print job.

In item 176, this method also provides access to the database to view the job parameter settings and the associated sources, and/or change the job parameter settings, using a graphic user interface that is operatively connected to the computerized device. The access to the database in item 176 is provided before and/or after the marking device prints the print job in item 172.

When evaluating the print job in item 152, this method identifies potential settings and sources, and final settings and sources of the job parameter settings and the associated sources. The final settings and sources are used to perform the RIPing, marking, and finishing operations in item 168, while the potential setting and sources comprise a pre-RIPing, marking, and finishing print job preparation history that is maintained in the database (item 154) and can be accessed before and/or after the marking device prints the print job.

Figure 3:
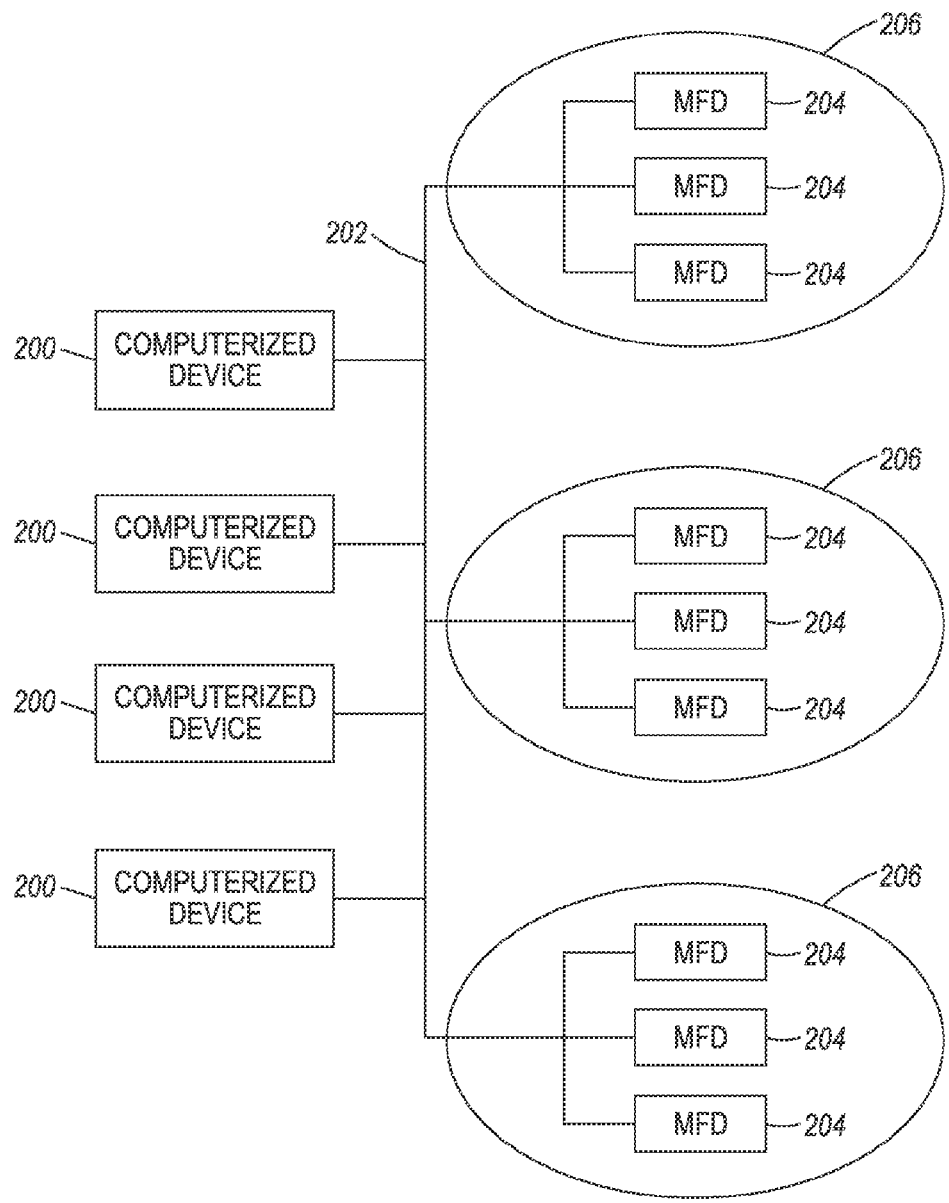
FIG. 3 is a schematic diagram illustrating systems herein.

As shown in FIG. 3, exemplary system and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 4:
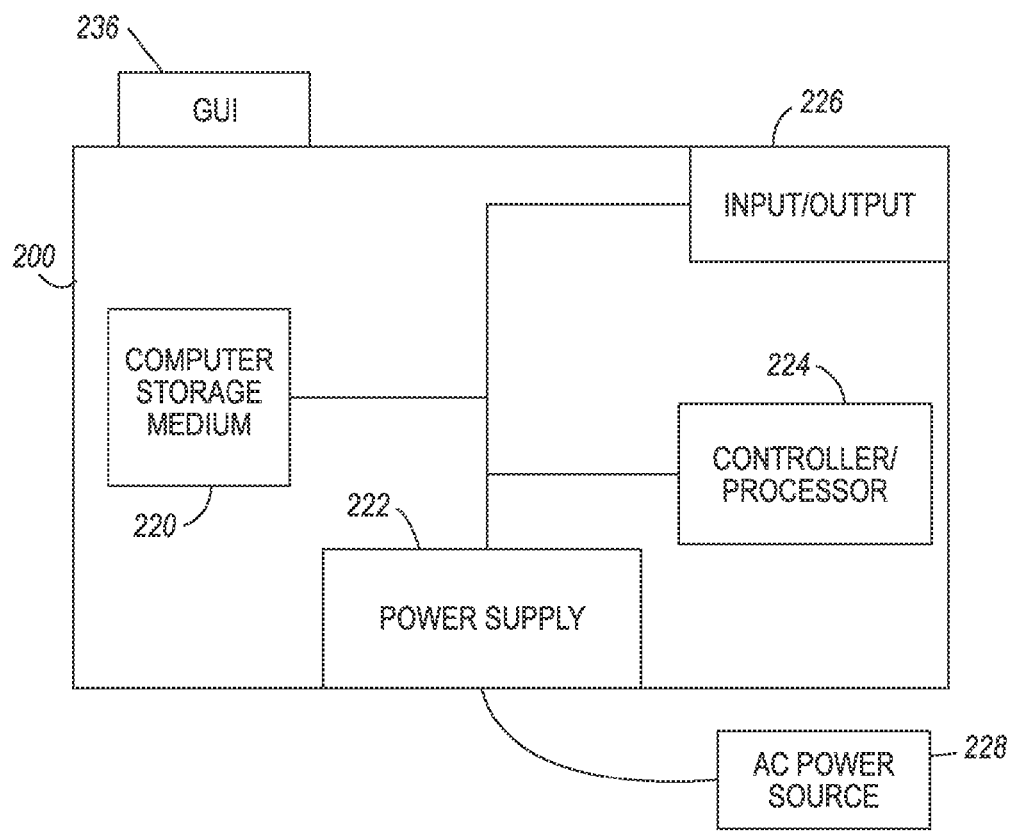
FIG. 4 is a schematic diagram illustrating devices herein.

FIG. 4 illustrates a computerized device 200, which can be used with systems and methods herein and can comprise, for example, a print server, a personal computer, a portable computing device, etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236, that also operate on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 3, a body housing has one or more functional components that operate on power supplied from an alternating current (AC) source 228 by the power supply 222. The power supply 222 can comprise a power storage element (e.g., a battery, etc).

Figure 5:
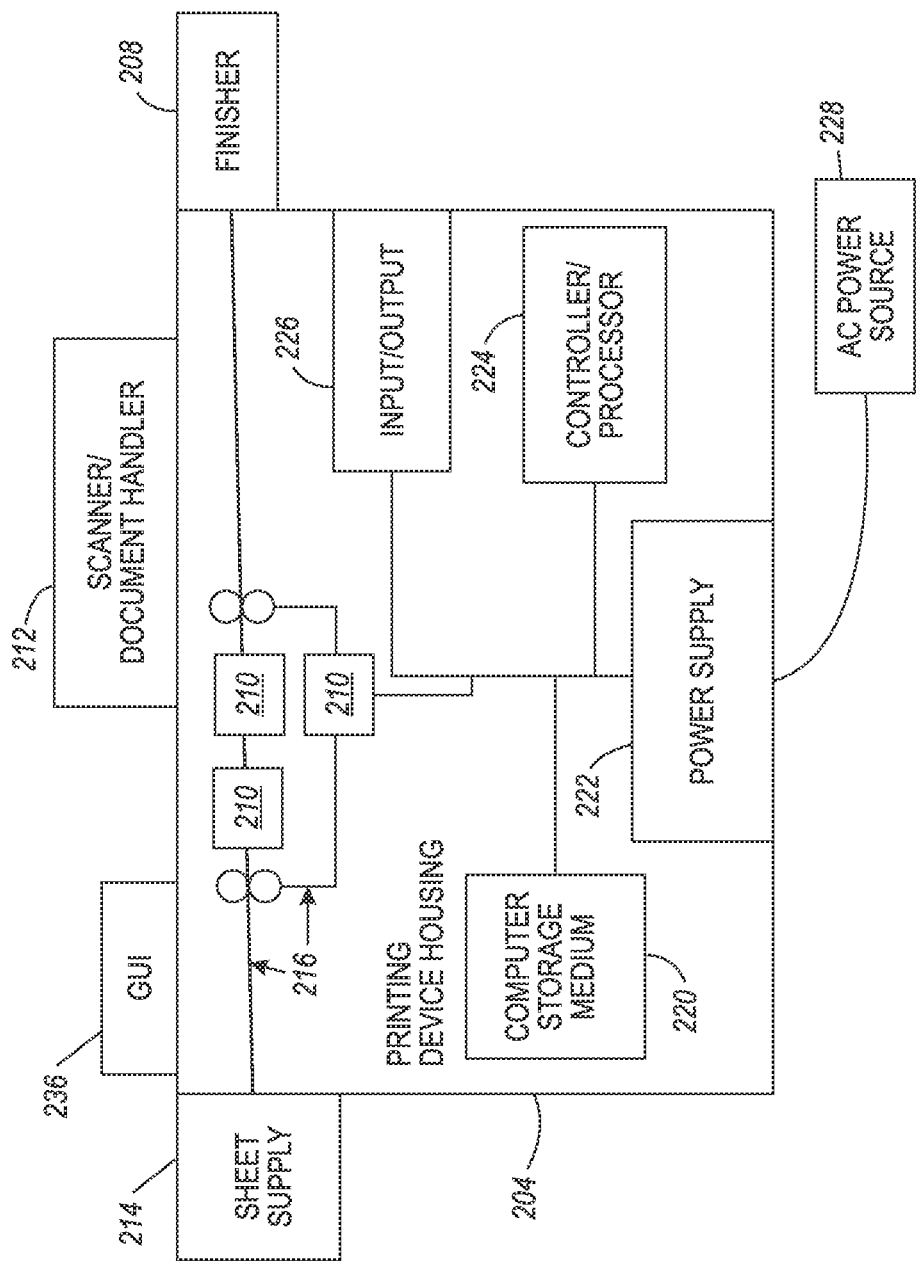
FIG. 5 is a schematic diagram illustrating devices herein.

FIG. 5 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

Therefore, exemplary systems (FIG. 3) and printing devices (FIGS. 4 and 5) herein comprise a computerized device 224 that receives a print job. The computerized device 224 evaluates the print job to identify job parameter settings and associated sources of such job parameter settings. A non-transitory computer storage medium 220 is operatively (meaning directly or indirectly) connected to the computerized device 224, and the computerized device 224 transmits the job parameter settings and the associated sources to a database stored within the non-transitory computer storage medium 220. Each print job can have its own separate database.

In addition, a marking device 210 is operatively connected to the computerized device 224. The computerized device 224 transmits the print job to cause the marking device 210 to print the print job. Also, a graphic user interface 236 is operatively connected to the computerized device 224, and the graphic user interface 236 provides access to the database to allow a user to view the job parameter settings and the associated sources, and/or change the job parameter settings. The graphic user interface 236 provides access to the database before or after the marking device 210 prints the print job.

The computerized device 224 raster image processes (RIPs) the print job before printing the print job using the marking device 210. Further, the computerized device 224 identifies "potential" settings and sources, and "final" settings and sources of the job parameter settings and the associated sources when evaluating the print job. These final settings and sources are the ones actually used to perform the raster image processing (RIPing); however, all the potential setting and sources are all maintained in the database to provide a pre-RIPing print job preparation history. Further, the database maintains the potential setting and sources, and the final settings and sources before and after the marking device 210 prints the print job to allow user diagnosis, etc.

Specifically, these "associated sources" can include, for example: a print job property attributes source; a print job ticket attributes source; a print queue attributes source; a page exception attributes source; etc. Similarly, the "job parameter settings" can include, for example: print job properties values; print job ticket values; print queue values; page exception source values; etc.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, processors, etc.) are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

A raster image processor (RIP) is a component used in a printing system that produces a raster image also known as a bitmap. The bitmap is then sent to a printing device for output. Raster image processing is the process that turns vector digital information into a high-resolution raster image.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like. To render an image is to reduce the image data (or a signal thereof) to viewable form; store the image data to memory or a storage device for subsequent retrieval; or communicate the image data to another device. Such communication may take the form of transmitting a digital signal of the image data over a network. In addition, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

Unless specifically defined in a specific claim itself, steps or components of the systems and methods herein cannot be implied or imported from any above example as limitations to any particular order, number, position, size, shape, angle, color, or material.

What is claimed is:

1. A method comprising:
   receiving a print job into a computerized device;
   raster image processing (RIPing) said print job before printing said print job;
   evaluating said print job to identify job parameter settings and associated sources of said job parameter settings using said computerized device,
     said evaluating said print job identifying potential settings and sources and final settings and sources of said job parameter settings and said associated sources,
     said potential setting and sources comprising pre-RIPing job parameter settings and said associated sources,
     said final settings and sources comprising job parameter settings and said associated sources used to perform said RIPing,
     a difference between said potential settings and sources and said final settings and sources providing a print job RIPing history,
     said evaluating said print job including said print job RIPing history as part of said job parameter settings and associated sources;
   transmitting said job parameter settings and said associated sources from said computerized device to a database stored within a non-transitory computer storage medium operatively connected to said computerized device;
   transmitting said print job from said computerized device to a marking device operatively connected to said computerized device to cause said marking device to print said print job; and
   providing access to said database to at least one of:
     view said job parameter settings and said associated sources and said print job RIPing history to provide a pre-RIPing, marking, and finishing print job history; and
     change said job parameter settings, using a graphic user interface operatively connected to said computerized device,
   said access to said database being provided one of before and after said marking device prints said print job.

2. The method according to claim 1, further comprising maintaining said potential setting and sources, and said final settings and sources in said database before and after said marking device prints said print job.

3. The method according to claim 1, said associated sources comprising at least one of: a print job property attributes source; a print job ticket attributes source; a print queue attributes source; and a page exception attributes source, and
   said job parameter settings comprising at least one of: print job properties values; print job ticket values; print queue values; and page exception source values.

4. The method according to claim 1, each said print job comprising a different database.

5. A method comprising:
   receiving a print job into a computerized device of a printing device;
   raster image processing (RIPing) said print job before printing said print job;

evaluating said print job to identify job parameters settings and associated sources of said job parameter settings using said computerized device,
  said evaluating said print job identifying potential settings and sources and final settings and sources of said job parameter settings and said associated sources,
  said potential setting and sources comprising pre-RIPing job parameter settings and said associated sources,
  said final settings and sources comprising job parameter settings and said associated sources used to perform said RIPing,
  a difference between said potential settings and sources and said final settings and sources providing a print job RIPing history,
  said evaluating said print job including said print job RIPing history as part of said job parameter settings and associated sources;
transmitting said job parameter settings and said associated sources from said computerized device to a database stored within a non-transitory computer storage medium of said printing device that is operatively connected to said computerized device;
transmitting said print job from said computerized device to a marking device of said printing device that is operatively connected to said computerized device to cause said marking device to print said print job; and
providing access to said database to at least one of:
  view said job parameter settings and said associated sources and said print job RIPing history to provide a pre-RIPing, marking, and finishing print job history; and
  change said job parameter settings, using a graphic user interface of said printing device that is operatively connected to said computerized device,
said access to said database being provided one of before and after said marking device prints said print job.

6. The method according to claim 5, further comprising maintaining said potential setting and sources, and said final settings and sources in said database before and after said marking device prints said print job.

7. The method according to claim 5, said associated sources comprising at least one of: a print job property attributes source; a print job ticket attributes source; a print queue attributes source; and a page exception attributes source, and
  said job parameter settings comprising at least one of: print job properties values; print job ticket values; print queue values; and page exception source values.

8. The method according to claim 5, each said print job comprising a different database.

9. A system comprising:
a computerized device receiving a print job, said computerized device raster image processing (RIPing) said print job before printing said print job, and said computerized device evaluating said print job to identify job parameter settings and associated sources of said job parameter settings,
  said evaluating said print job identifying potential settings and sources and final settings and sources of said job parameter settings and said associated sources,
  said potential setting and sources comprising pre-RIPing job parameter settings and said associated sources,
  said final settings and sources comprising job parameter settings and said associated sources used to perform said RIPing,
  a difference between said potential settings and sources and said final settings and sources providing a print job RIPing history,
  said evaluating said print job including said print job RIPing history as part of said job parameter settings and associated sources;
a non-transitory computer storage medium operatively connected to said computerized device, said computerized device transmitting said job parameter settings and said associated sources to a database stored within said non-transitory computer storage medium;
a marking device operatively connected to said computerized device, said computerized device transmitting said print job to cause said marking device to print said print job; and
a graphic user interface operatively connected to said computerized device, said graphic user interface providing access to said database to at least one of:
  view said job parameter settings and said associated sources and said print job RIPing history to provide a pre-RIPing, marking, and finishing print job history; and
  change said job parameter settings,
said graphic user interface providing access to said database one of before and after said marking device prints said print job.

10. The system according to claim 9, said database maintaining said potential setting and sources, and said final settings and sources before and after said marking device prints said print job.

11. The system according to claim 9, said associated sources comprising at least one of: a print job property attributes source; a print job ticket attributes source; a print queue attributes source; and a page exception attributes source, and
  said job parameter settings comprising at least one of: print job properties values; print job ticket values; print queue values; and page exception source values.

12. The system according to claim 9, each said print job comprising a different database.

13. A printing device comprising:
a computerized device receiving a print job, said computerized device raster image processing (RIPing) said print job before printing said print job, and said computerized device evaluating said print job to identify job parameter settings and associated sources of said job parameter settings,
  said evaluating said print job identifying potential settings and sources and final settings and sources of said job parameter settings and said associated sources,
  said potential setting and sources comprising pre-RIPing job parameter settings and said associated sources,
  said final settings and sources comprising job parameter settings and said associated sources used to perform said RIPing,
  a difference between said potential settings and sources and said final settings and sources providing a print job RIPing history,
  said evaluating said print job including said print job RIPing history as part of said job parameter settings and associated sources;
a non-transitory computer storage medium operatively connected to said computerized device, said computerized device transmitting said job parameter settings and said associated sources to a database stored within said non-transitory computer storage medium;

a marking device operatively connected to said computerized device, said computerized device transmitting said print job to cause said marking device to print said print job; and a graphic user interface operatively connected to said computerized device, said graphic user interface providing access to said database to at least one of:
- view said job parameter settings and said associated sources and said print job RIPing history to provide a pre-RIPing, marking, and finishing print job history; and
- change said job parameter settings, said graphic user interface providing access to said database one of before and after said marking device prints said print job.

14. The printing device according to claim 13, said database maintaining said potential setting and sources, and said final settings and sources before and after said marking device prints said print job.

15. The printing device according to claim 13, said associated sources comprising at least one of: a print job property attributes source; a print job ticket attributes source; a print queue attributes source; and a page exception attributes source, and said job parameter settings comprising at least one of: print job properties values; print job ticket values; print queue values; and page exception source values.

16. The printing device according to claim 13, each said print job comprising a different database.

* * * * *